UNITED STATES PATENT OFFICE.

LOUIS COLLARDON, OF WEST BROMWICH, ENGLAND.

MANUFACTURE OF SUBSTANCES FROM CELLULOSE ESTERS, CELLULOSE COMPOUNDS, INDIA-RUBBER, AND OTHER INGREDIENTS.

1,128,851.            Specification of Letters Patent.      Patented Feb. 16, 1915.

No Drawing.      Application filed January 20, 1913. Serial No. 743,199.

*To all whom it may concern:*

Be it known that I, LOUIS COLLARDON, a citizen of Argentina, residing at 73 Bratt street, West Bromwich, in the county of Warwickshire, England, have invented new and useful Improvements in the Manufacture of Substances from Cellulose Esters, Cellulose Compounds, India-Rubber, and other Ingredients, of which the following is a specification.

The invention relates to the manufacture of substances consisting of condensation products obtained by the action of formaldehyde or para-formaldehyde on carbolic acid or other phenols or cresols, and of cellulose esters, india-rubber and other ingredients.

My invention consists of certain methods of intimately compounding said condensation products with cellulose esters and in rendering the ultimate product insoluble in water by the action of heat or sulfur and heat.

The invention can be carried out in the following ways:—Soda or sulfite cellulose or hydro-cellulose or any cellulose material, such as cotton, hemp, flax, ramie, esparto or clean textile waste, is worked up in a paper-pulping machine with twice its weight of a 12–15 per cent. solution of caustic soda and is thoroughly mascerated. This product is mixed with a suitable percentage of its weight of carbon bisulfid and set aside for a short time, the resulting compound is commonly known as cellulose xanthate. This compound is then mixed with the phenol or cresol and an equal quantity of formaldehyde and worked or condensed by means of heated rollers to a homogeneous plastic mass. The mixture is then passed through a calender in thin sheets, which are dried or steamed until they become insoluble in water and then washed until all impurities are removed.

To the plastic mass of condensate freed from water I can add during the mixing india-rubber, guttapercha, balata, murac or other products obtained from the latexes of other plants and trees or the usual substances added as the filling material used in the commercial manufacture of rubber articles. The ultimate mass so obtained is molded or sheeted as are rubber articles and rendered completely resistant by the action of heat. When rubber is one of the ingredients of the mixture sulfur can also be included to effect the vulcanization under the final action of heat.

In the case of all hydrocellulose products it is advisable to add some hydrocarbon, bitumen, or mineral rubber, dissolved in carbon bisulfid, so as to somewhat diminish the porosity of the product.

According to another method of production suitable cellulose material is treated with a more or less concentrated solution of hydrochloric or sulfurous acid and after the cellulose material has become converted into a finely divided pulp chlorid of sulfur is added. An absolutely insoluble compound results, and this compound is thoroughly washed, then dried and finally reduced to a fine powder. Viscose solution may also be treated with chlorid of sulfur and after being washed and dried be reduced to a fine powder. Either of the fine powders so produced can be mechanically incorporated with the plastic condensate with or without the addition of india-rubber, guttapercha, balata, murac or other products obtained from the latexes of other plants and trees as well as the filling matters used in the commercial manufacture of rubber articles. The finished mass is treated in the manner already described with respect to the masses produced by the other methods of carrying out the invention.

Cellulose esters containing condensation products lend themselves to great variation in the exact methods by which they are produced and compounded, and the above described ways of carrying out the invention as well as certain of the ingredients are merely given by way of example.

Having now described my invention what I have invented and desire to secure by Letters Patent of the United States, is as follows:—

1. A process for the production of a substance similar to hard rubber, consisting in mixing a cellulose ester with a phenol and formaldehyde to form a plastic mass, adding rubber and a vulcanizing agent to the plastic mass, mixing the same by mechanical means, and vulcanizing the mixed product by heat.

2. A process for producing a waterproof substance, consisting in mechanically incorporating cellulose xanthate with a phenol and formaldehyde, rolling out the mixture into sheets, washing the same, and heating them.

3. As a new article of manufacture a hard product consisting of a mechanical mixture of cellulose xanthate and the product of condensation of a phenol and formaldehyde (both in plastic form) hardened by heat.

In testimony whereof I have signed my name to this specification in the presence of two subscribing witnesses.

LOUIS COLLARDON.

Witnesses:
 ARTHUR F. ENNIS,
 H. D. JAMESON.